(12) United States Patent
Davidson

(10) Patent No.: US 12,119,474 B1
(45) Date of Patent: Oct. 15, 2024

(54) ELECTRODE BONDING SYSTEM AND METHOD OF USE

(71) Applicant: Energizer Brands, LLC, St. Louis, MO (US)

(72) Inventor: Gregory James Davidson, Oregon, WI (US)

(73) Assignee: Energizer Brands, LLC, St. Louis, MO (US)

( * ) Notice: Subject to any disclaimer, the term of this patent is extended or adjusted under 35 U.S.C. 154(b) by 615 days.

(21) Appl. No.: 17/217,366

(22) Filed: Mar. 30, 2021

Related U.S. Application Data

(60) Provisional application No. 63/004,103, filed on Apr. 2, 2020.

(51) Int. Cl.
*B32B 41/00* (2006.01)
*H01M 4/04* (2006.01)
*H01M 10/04* (2006.01)

(52) U.S. Cl.
CPC ......... *H01M 4/04* (2013.01); *H01M 10/0431* (2013.01)

(58) Field of Classification Search
CPC ............................ H01M 4/04; H01M 10/0431
USPC .................... 156/60, 64, 350, 351, 378, 379
See application file for complete search history.

(56) References Cited

U.S. PATENT DOCUMENTS

| | | |
|---|---|---|
| 4,343,869 A | 8/1982 | Oltman et al. |
| 4,369,568 A | 1/1983 | Dopp |
| 5,306,582 A | 4/1994 | Tanaka |
| 5,451,473 A | 9/1995 | Oltman et al. |
| 5,567,539 A | 10/1996 | Takahashi et al. |
| 5,766,791 A | 6/1998 | Takahashi et al. |
| 5,958,617 A | 9/1999 | Kozuki et al. |
| 6,436,156 B1 | 8/2002 | Wandeloski et al. |
| 6,451,478 B1 | 9/2002 | Okahisa et al. |
| 6,468,691 B1 | 10/2002 | Malay et al. |
| 6,521,373 B1 | 2/2003 | Suzuki et al. |
| 6,521,379 B2 | 2/2003 | Nishida et al. |
| 6,537,693 B1 | 3/2003 | Suzuki et al. |
| 6,602,629 B1 | 8/2003 | Guo et al. |
| 6,610,353 B1 | 8/2003 | Gibbons et al. |

(Continued)

FOREIGN PATENT DOCUMENTS

| | | | |
|---|---|---|---|
| EP | 2 538 484 B1 | 12/2012 | |
| WO | WO-2012020658 A1 * | 2/2012 | ............ H01G 11/86 |
| WO | WO-2016/202556 A1 | 12/2016 | |

*Primary Examiner* — Michael N Orlando
*Assistant Examiner* — Joshel Rivera
(74) *Attorney, Agent, or Firm* — Foley & Lardner LLP

(57) ABSTRACT

A winding system includes a housing, a winding assembly, a bonding system, and a controller. The winding assembly is configured to wind electrode components about a mandrel to form a wound electrode arrangement. The bonding system includes an indexing assembly and a heating assembly. The indexing assembly includes a stationary support assembly and a transfer assembly moveably secured relative to the support assembly. The heating assembly is secured to a distal end of the transfer assembly. The heating assembly includes a housing that supports a distally extending resistive heating element. The controller operates the bonding system to effectuate a movement of the transfer assembly in a distal direction to apply a predetermined amount of pressure to an exterior of a wound electrode arrangement supported on the mandrel, and to heat the heating element to a predetermined temperature.

10 Claims, 8 Drawing Sheets

(56) References Cited

U.S. PATENT DOCUMENTS

| | | |
|---|---|---|
| 6,716,552 B2 | 4/2004 | Zhang et al. |
| 7,001,439 B2 | 2/2006 | Buckle |
| 7,001,689 B2 | 2/2006 | Buckle |
| 7,223,496 B2 | 5/2007 | Takahashi et al. |
| 7,452,627 B2 | 11/2008 | Lee |
| 7,455,882 B2 | 11/2008 | Gibbons et al. |
| 7,470,482 B2 | 12/2008 | Takamura et al. |
| 7,709,141 B2 | 5/2010 | Kim et al. |
| 7,816,026 B2 | 10/2010 | Janmey |
| 7,842,414 B2 | 11/2010 | Hong et al. |
| 7,960,048 B2 | 6/2011 | Jang et al. |
| 7,993,778 B2 | 8/2011 | Yim et al. |
| 8,048,559 B2 | 11/2011 | Kim |
| 8,062,787 B2 | 11/2011 | Kim |
| 8,173,296 B2 | 5/2012 | Lee |
| 8,288,036 B2 | 10/2012 | Kim |
| 8,298,704 B2 | 10/2012 | Matsuhisa et al. |
| 8,394,533 B2 | 3/2013 | Bak |
| 8,399,125 B2 | 3/2013 | Kim |
| 8,409,736 B2 | 4/2013 | Wang et al. |
| 8,455,124 B2 | 6/2013 | Kim |
| 8,541,132 B2 | 9/2013 | Kim |
| 8,546,007 B2 | 10/2013 | Lee et al. |
| 8,673,485 B2 | 3/2014 | Yamazaki et al. |
| 8,679,672 B2 | 3/2014 | Yamaguchi et al. |
| 8,815,437 B2 | 8/2014 | Lee |
| 8,865,344 B2 | 10/2014 | Kim et al. |
| 8,940,435 B2 | 1/2015 | Kim et al. |
| 8,945,242 B2 | 2/2015 | Mineya et al. |
| 8,993,148 B2 | 3/2015 | Wang et al. |
| 9,005,802 B2 | 4/2015 | Humphrys et al. |
| 9,034,512 B2 | 5/2015 | Sato et al. |
| 9,083,053 B2 | 7/2015 | Humphrys |
| 9,178,188 B2 | 11/2015 | Lim |
| 9,178,190 B2 | 11/2015 | Kim et al. |
| 9,178,251 B2 | 11/2015 | Gaugler |
| 9,350,004 B2 | 5/2016 | Kim |
| 9,502,698 B2 | 11/2016 | Takahashi et al. |
| 9,515,301 B2 | 12/2016 | Hattori |
| 9,564,654 B2 | 2/2017 | Wang et al. |
| 9,614,247 B2 | 4/2017 | Ensling et al. |
| 9,748,550 B2 | 8/2017 | Kim |
| 9,755,203 B2 | 9/2017 | Kim et al. |
| 9,793,572 B2 | 10/2017 | Lee et al. |
| 10,128,477 B2 | 11/2018 | Lee et al. |
| 10,164,306 B2 | 12/2018 | Allen et al. |
| 10,193,125 B2 | 1/2019 | Doo et al. |
| 10,283,750 B2 | 5/2019 | Lee et al. |
| 10,418,620 B2 | 9/2019 | Lee et al. |
| 2003/0013014 A1 | 1/2003 | Ashihara et al. |
| 2003/0104275 A1 | 6/2003 | Ishida et al. |
| 2004/0197645 A1 | 10/2004 | Buckle |
| 2007/0054168 A1 | 3/2007 | Chang et al. |
| 2007/0224495 A1 | 9/2007 | Gibbons et al. |
| 2007/0224500 A1 | 9/2007 | White et al. |
| 2008/0206628 A1 | 8/2008 | Honbou |
| 2008/0254354 A1 | 10/2008 | Adams |
| 2009/0098445 A1 | 4/2009 | Kim |
| 2010/0291422 A1 | 11/2010 | Deng et al. |
| 2011/0250488 A1 | 10/2011 | Park |
| 2012/0321960 A1 | 12/2012 | Kim et al. |
| 2013/0230749 A1 | 9/2013 | Kim et al. |
| 2014/0045009 A1 | 2/2014 | Kim |
| 2014/0147716 A1 | 5/2014 | Oh et al. |
| 2014/0220394 A1 | 8/2014 | Kim et al. |
| 2014/0287298 A1 | 9/2014 | Sumihiro |
| 2015/0118545 A1 | 4/2015 | Komatsu et al. |
| 2016/0079584 A1 | 3/2016 | Lee et al. |
| 2017/0062778 A1 | 3/2017 | Mille et al. |
| 2017/0279087 A1 | 9/2017 | Tsuda et al. |
| 2018/0219199 A1 | 8/2018 | Lee et al. |
| 2018/0301668 A1 | 10/2018 | Nicholls |
| 2019/0165411 A1 | 5/2019 | Tu et al. |
| 2020/0295330 A1 | 9/2020 | Armacanqui et al. |

\* cited by examiner

ELECTRODE BONDING SYSTEM AND METHOD OF USE

CROSS-REFERENCE TO RELATED PATENT APPLICATIONS

This Application claims the benefit of and priority to U.S. Provisional Application No. 63/004,103 filed on Apr. 2, 2020, the entire disclosure of which is hereby incorporated by reference herein.

BACKGROUND

During the assembly of a battery having a jellyroll electrode, a wound electrode arrangement is sealed within an interior of a battery housing. Prior to the insertion of the electrode arrangement into the battery housing interior, the electrode arrangement may be secured against unwinding to prevent a loosening of (and corresponding increase in the volume of the housing interior occupied by) the electrode arrangement. Thus, the securement of the electrode arrangement prior to the assembly of a battery allows more active material to be contained within the housing interior, thereby increasing the discharge capacity of the battery.

Conventional methods of securing a wound electrode arrangement against loosening commonly utilize adhesive tape. Such methods require that the components (e.g., anode, cathode, separator, etc.) of the electrode arrangement be cut from their respective sources (e.g., spools) prior to the application of the adhesive tape to the electrode arrangement. However, cutting the components releases the tension held in the electrode arrangement, and as such, the tight wind of the electrode arrangement achieved during the winding process is often subject to a degree of loosening before the adhesive tape has been applied to secure the electrode arrangement. Thus, the diameter (and correspondingly volume) of the electrode arrangement upon its securement is typically greater than the diameter and volume of the electrode arrangement prior to the components being cut from their sources. The added adhesive tape applied about the exterior of the electrode assembly also contributes to the increased diameter, and thus volume, of the secured electrode arrangement.

Additionally, conventional systems and methods are typically only suitable for securing larger wound electrode arrangements that are able to be secured using a large piece of stiff tape In contrast to the easily dispensable and easy to apply adhesive tape used to secure larger electrode arrangement, the very small and very thin adhesive tape needed secure smaller electrode arrangements (e.g., electrode arrangements having a diameter of approximately 6 mm or less) interferes with the ability to easily and accurately align and apply the tape to such smaller electrode arrangements. As a result, the securement of smaller electrode arrangements requires a very skilled person to complete the taping successfully, and also tends to have a high reject rate for misplaced tape or damaged would electrode assemblies.

SUMMARY

In one implementation of the present disclosure, a winding system includes a housing, a winding assembly, a bonding system, and a controller. The winding assembly is configured to wind electrode components about a mandrel to form a wound electrode arrangement. The bonding system includes an indexing assembly and a heating assembly. The indexing assembly includes a stationary support assembly and a transfer assembly moveably secured relative to the support assembly. The heating assembly is secured to a distal end of the transfer assembly. The heating assembly includes a housing that supports a distally extending resistive heating element. The controller operates the bonding system to effectuate a movement of the transfer assembly in a distal direction to apply a predetermined amount of pressure to an exterior of a wound electrode arrangement supported on the mandrel, and to heat the heating element to a predetermined temperature.

In some implementations, the transfer assembly includes a proximal end that is securable to an actuatable element, and a distal end that supports the heat assembly. The transfer assembly optionally includes an overload element that provides a resistive force that opposes a force applied by the actuatable element during operation of the bonding system such that a force applied by the heating assembly to the exterior of the electrode arrangement is less than the force applied by the actuatable element.

In one implementation of the present disclosure, a bonding system for securing a wound electrode arrangement against loosening includes an indexing assembly and a heating assembly. The indexing assembly includes a support assembly having a base plate and a guide element provided thereon, and a transfer assembly. The transfer assembly includes a mounting plate, a guide structure and a connector component. The guide structure is secured to the mounting plate, and is configured to engage the guide element to moveably secure the mounting plate relative to the base plate of the indexing system. The connector component includes a mounting block, an adapter attachment and an overload element. The mounting block is secured to a proximal end of the mounting plate. The adapter attachment is configured to secure the connector component to an actuatable element of an actuator. The overload element extends between the mounting block and adapter attachment. The heating assembly is secured to a distal surface of the mounting plate. The overload element provides a resistive force that opposes a force applied to the bonding system by an actuator during operation of the bonding system.

In some implementations, the adapter attachment is optionally adjustable to vary a length of the overload element. For example, the adapter attachment includes a lower cylinder that is movably coupled to an upper cylinder. The length of the overload element is adjustable responsive to a movement of the lower cylinder relative to the upper cylinder.

In some implementations, varying a length of the overload element changes the amount of resistive force provided by the overload element upon being subject to a predetermined amount of pressure. The heating assembly includes a housing that supports a distally extending heating element having a distally tapering tip.

In one implementation of the present disclosure, a method of securing an electrode arrangement against loosening includes operating an actuatable element to extend a heating element of a bonding system into contact with an exterior of an electrode arrangement formed from a wound arrangement of electrode components. Each of the electrode components have a first end and a second end. A first end of each electrode component defines a portion of the wound electrode arrangement, and a second end of each electrode component is held in tension, and does not define a portion of the wound electrode. A predetermined amount of pressure is applied to the exterior of the electrode arrangement. While pressure is being applied to the electrode arrangement, the heating element is operated to heat the electrode arrangement. At least one of the electrode components is cut following the termination of the application of heat and pressure to the electrode arrangement. The second end of each electrode component is optionally in tension until the electrode component is cut.

In some implementations, an outermost wind layer of the electrode arrangement is heat-bonded to an underlying wind layer upon termination of the application of heat and pressure to the electrode arrangement. The application of pressure and heat to the electrode arrangement is terminated following a melting of an outermost wind layer of the electrode arrangement. A force imparted by the heating element onto the electrode arrangement is less than a force provided by an actuator to the bonding system.

In some implementations, at least one of the electrode components is cut and at least one electrode component remains uncut prior to the application of heat and pressure to the electrode arrangement. The uncut electrode component is optionally wound about the outermost wind layer of the electrode arrangement prior to the application of heating and pressure to the electrode arrangement. The outermost wind layer of the uncut electrode component is optionally heat-bonded directly to an underlying wind layer of the uncut electrode component upon termination of the application of heat and pressure to the electrode arrangement.

In some implementations, the application of heat and pressure to the electrode arrangement is terminated responsive to an observed change in at least one of a color and degree of transparency of an outermost layer of the electrode arrangement.

The foregoing summary is illustrative only and is not intended to be in any way limiting. In addition to the illustrative aspects, embodiments and features described above, further aspects, embodiments and features will become apparent by reference to the following drawings and the detailed description.

DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

Referring generally to the FIGURES, a bonding system for securing the components (e.g., an anode layer, a cathode layer, separator layer(s), etc.) of a coiled, jellyroll electrode against loosening (e.g. unwinding) is shown and described according to various embodiments.

Figure 1A:
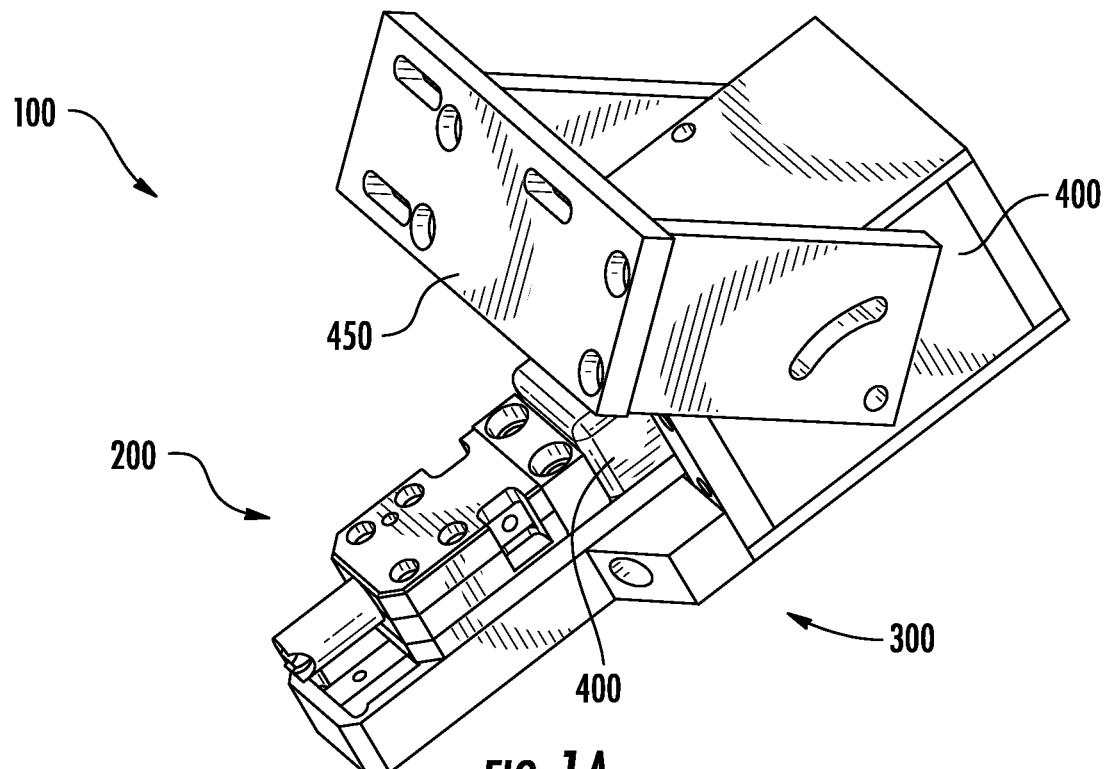
FIG. 1A illustrates a perspective view of a bonding system in a retracted configuration, according to one embodiment.
Figure 1B:
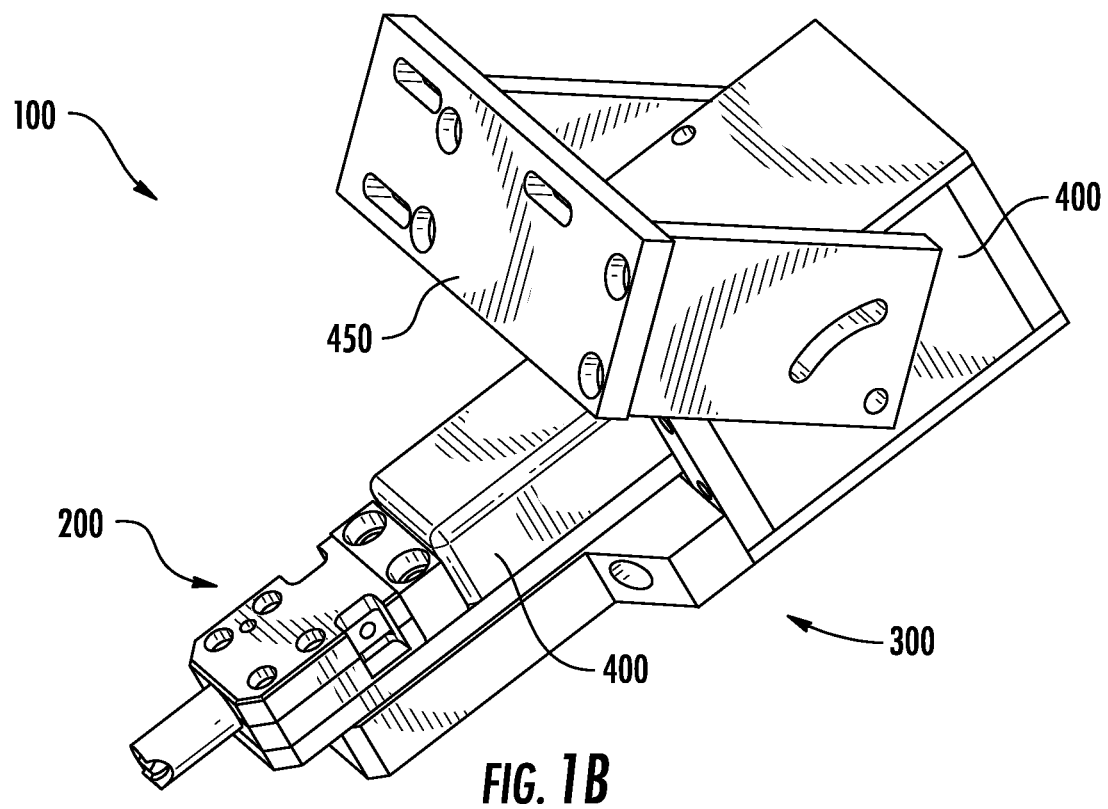
FIG. 1B illustrates a perspective view of the bonding system of FIG. 1A in an extended configuration, according to one embodiment.

As shown in FIGS. 1A and 1B, the bonding system 100 generally includes a heating assembly 200 and an indexing assembly 300. The indexing assembly 300 allows for varying degrees of movement of the heating assembly 200 in proximal and distal directions. The selective operation of the indexing assembly 300 effectuates movement of the heating assembly 200 between one or more extended configurations (such as, e.g., representatively shown in FIG. 1A) and one or more retracted configurations (such as, e.g., representatively shown in FIG. 1B).

The heating assembly 200 selectively applies heat and sustained pressure to heat-bond an outermost wind layer of a wound electrode arrangement to an underlying wind layer. By utilizing the melt properties of the electrode components, the heating assembly 200 is able to secure the electrode arrangement against loosening without the need to apply any additional material (e.g. adhesive tape) to the electrode arrangement. The heating assembly 200 thus minimizes the overall size of the finished jellyroll electrode. This advantageously decreases the volume of a batter housing interior occupied by the jellyroll electrode, thereby allowing more active material to be added to the battery housing interior during the assembly of a battery cell.

The heating assembly 200 is advantageously also able to secure the wound electrode arrangement prior to the separation of each of the electrode components from their respective sources (e.g., spools). This allows tension to be held in the electrode arrangement prior to, and during, operation of the heating assembly 200, and thereby minimizes (e.g., prevents) loosening of the initial, tight wind of electrode arrangement achieved during the winding process. The ability to maintain the initial winding tightness during operation of the bonding system 100 thereby allows a greater amount of active material to be housed within the battery housing interior than would be possible if the electrode arrangement were secured using conventional methods and systems.

Figure 2:
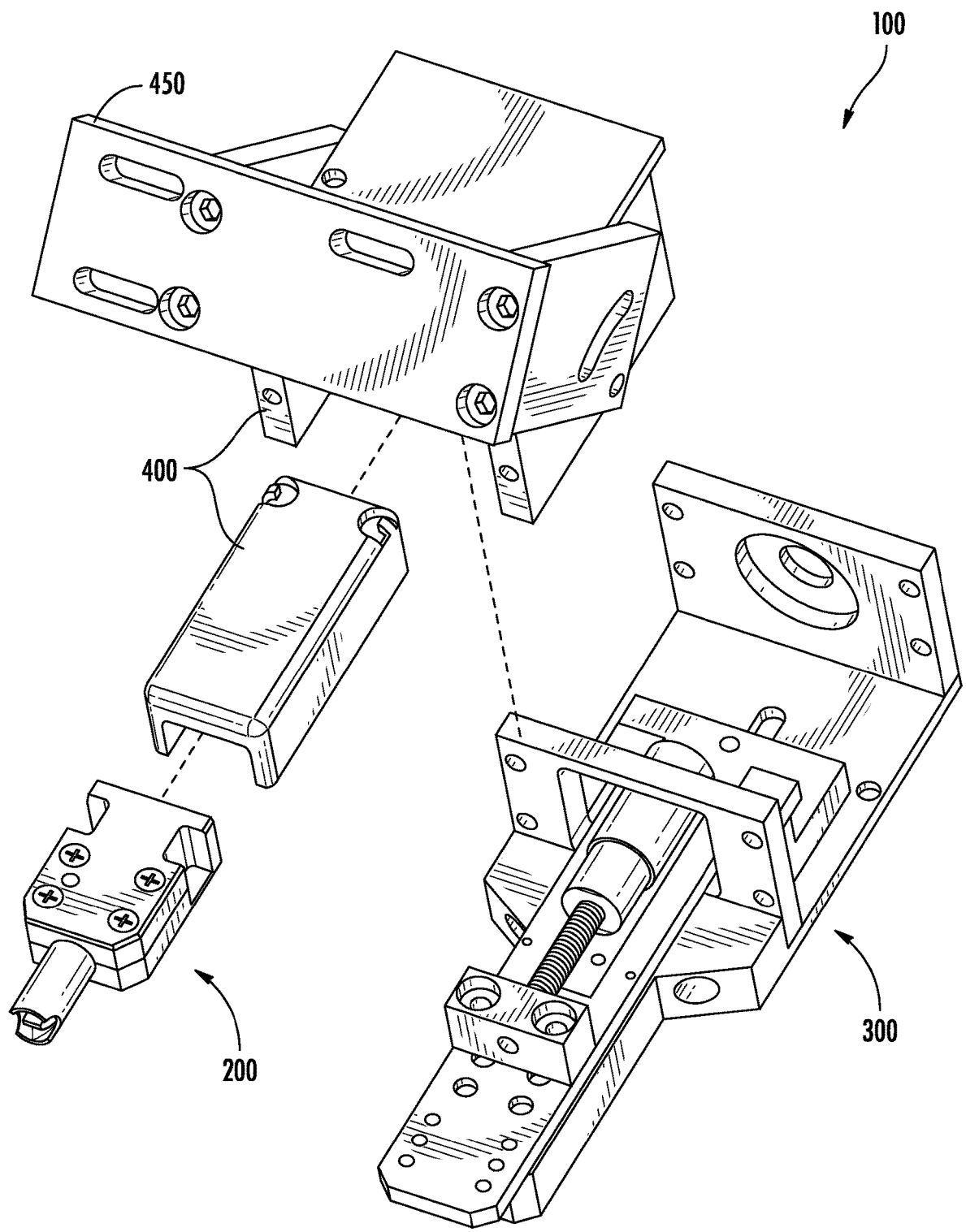
FIG. 2 is an exploded view of a bonding system, according to one embodiment.

As shown in FIG. 2, in addition to the heating assembly 200 and indexing assembly 300, the bonding system 100 optionally also includes a mounting element 450 via which the bonding system 100 may be secured relative to a housing 20 of a winding system 10 (or other structure) with which the bonding system 100 may be used. Optional cover elements 400 protect the components of the heating assembly 200 and indexing assembly 300 from damage, and prevent heat generated by the heating assembly 200 from damaging components of the winding system 10 (or other system) with which the bonding system 100 is used.

Figure 3A:
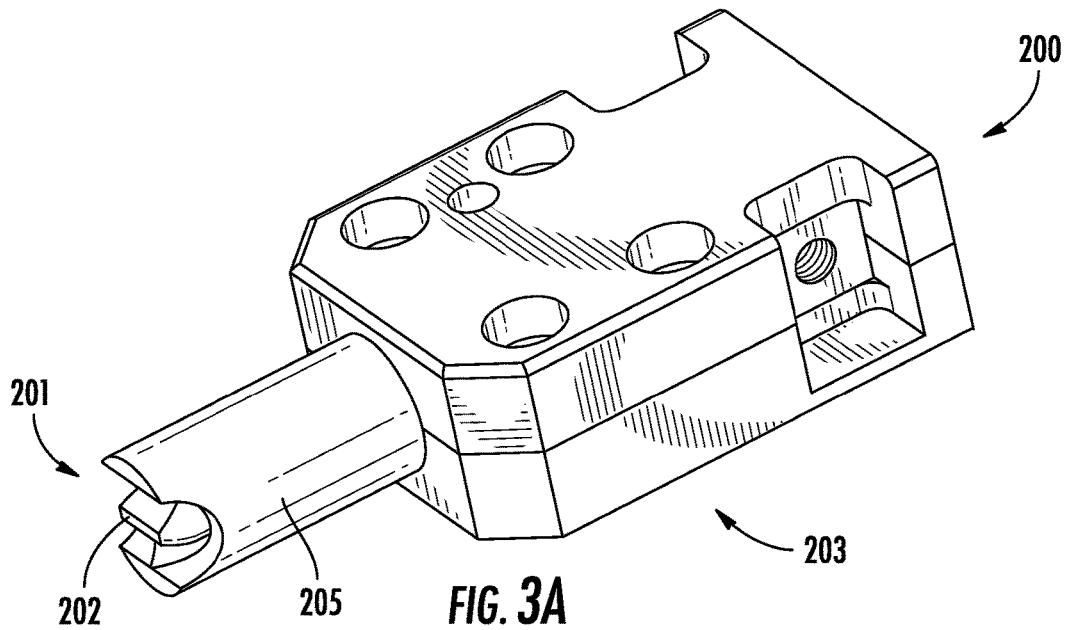
FIG. 3A illustrates a perspective view of a heating assembly, according to one embodiment.
Figure 3B:
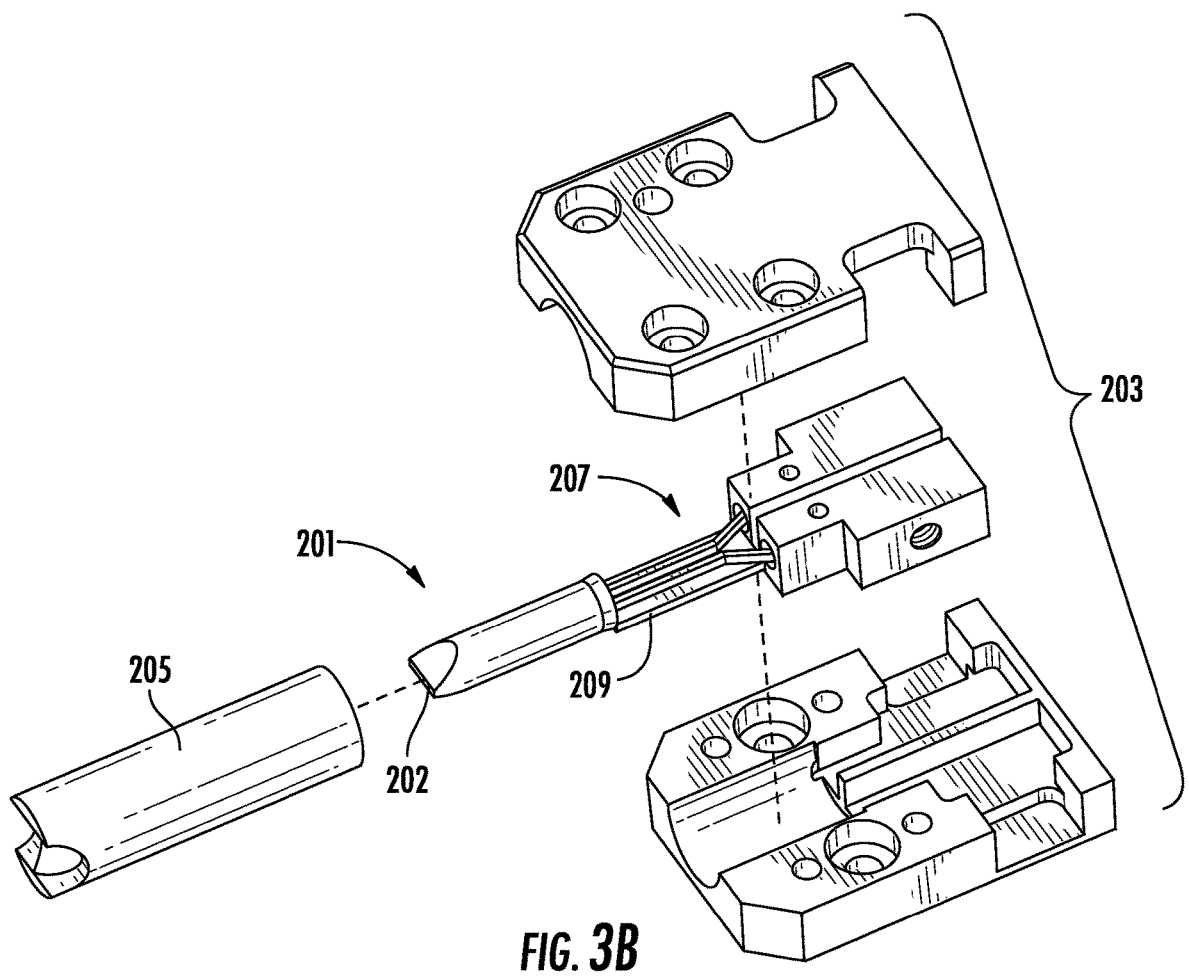
FIG. 3B is an exploded view of the heating assembly of FIG. 3A, according to one embodiment.

Referring to FIGS. 3A and 3B, a heating assembly 200 of the bonding system 100 is shown according to one example embodiment. The heating assembly 200 is used to generate sufficient heat to melt an outermost wind layer of an electrode arrangement to an underlying wind layer, thereby heat-bonding the electrode arrangement against a loosening (e.g., unwinding). As shown in FIGS. 3A and 3B, the heating assembly 200 generally includes a heating element 201 and an electrical connector 207 that are each secured relative to the indexing assembly 300 by a housing 203. A heat shield 205 that surrounds the heating element 201 is also optionally supported by the housing 203.

The heating element 201 is supported external the housing 203, and extends in a distal direction relative to the housing 203. The housing 203 is secured along a mounting surface 352 provided at a distal end of a mounting plate 351 of a transfer assembly 350 of the indexing assembly 300 (see, e.g., FIG. 6). Accordingly, actuation of the transfer assembly 350 (and housing 203 secured thereto) to an extended configuration allows the heating element 201 to be positioned adjacent (e.g., in contact with) an exterior surface of a wound electrode arrangement (such as representatively shown in FIG. 8B).

The heating element 201 may be formed from a variety of materials and/or structures that allow a temperature of the heating element 201 to be selectively varied to achieve a desired target temperature. For example, the heating element 201 may comprise a miniature resistive heating component made from ceramic, or other material. The heating element 201 is optionally selectively removable from the housing 203, allowing heating elements 201 of different shapes, sizes, materials, constructions, etc. to be substituted as needed during different operations of the bonding system 100.

As shown in FIG. 3B, the heating element 201 generally includes a tapered (e.g., beveled, chiseled, etc.) distal tip having a contact surface 202 that allows for a localized application of heat and pressure to the exterior of a wound electrode arrangement. The contact surface 202 is dimensioned such that the area of the electrode arrangement heat-bonded during operation of the heating assembly 200 is large enough to provide the needed strength to maintain the electrode arrangement in the secured, wound configuration. Additionally, the contact surface 202 is dimensioned to define an area that is large enough to distribute pressure to the outer surface of the electrode arrangement during the bonding process without risking any damage (e.g., puncturing) to the electrode components forming the electrode arrangement.

The electrical connector 207 is supported within an interior of the housing 203 by an optional spacer element 209. The electrical connector 207 uses energy suppled from a power source (not shown) to supply the heating element 201 with current during operation of the heating assembly 200. As described below, the supply of current using the electrical connector 207 is optionally controlled via a controller (not shown). The power source and/or controller are optionally integrated into the bonding system 100. For example, one or both of the power source and controller are supported within the housing 203 of the heating assembly 200, or are otherwise supported relative to the indexing assembly 300. Alternatively, the electrical connector 207 is wired to an external power source and/or the supply of current to the heating element 201 is controlled via a wired connection between the electrical connector 207 and an external controller.

Figure 4:
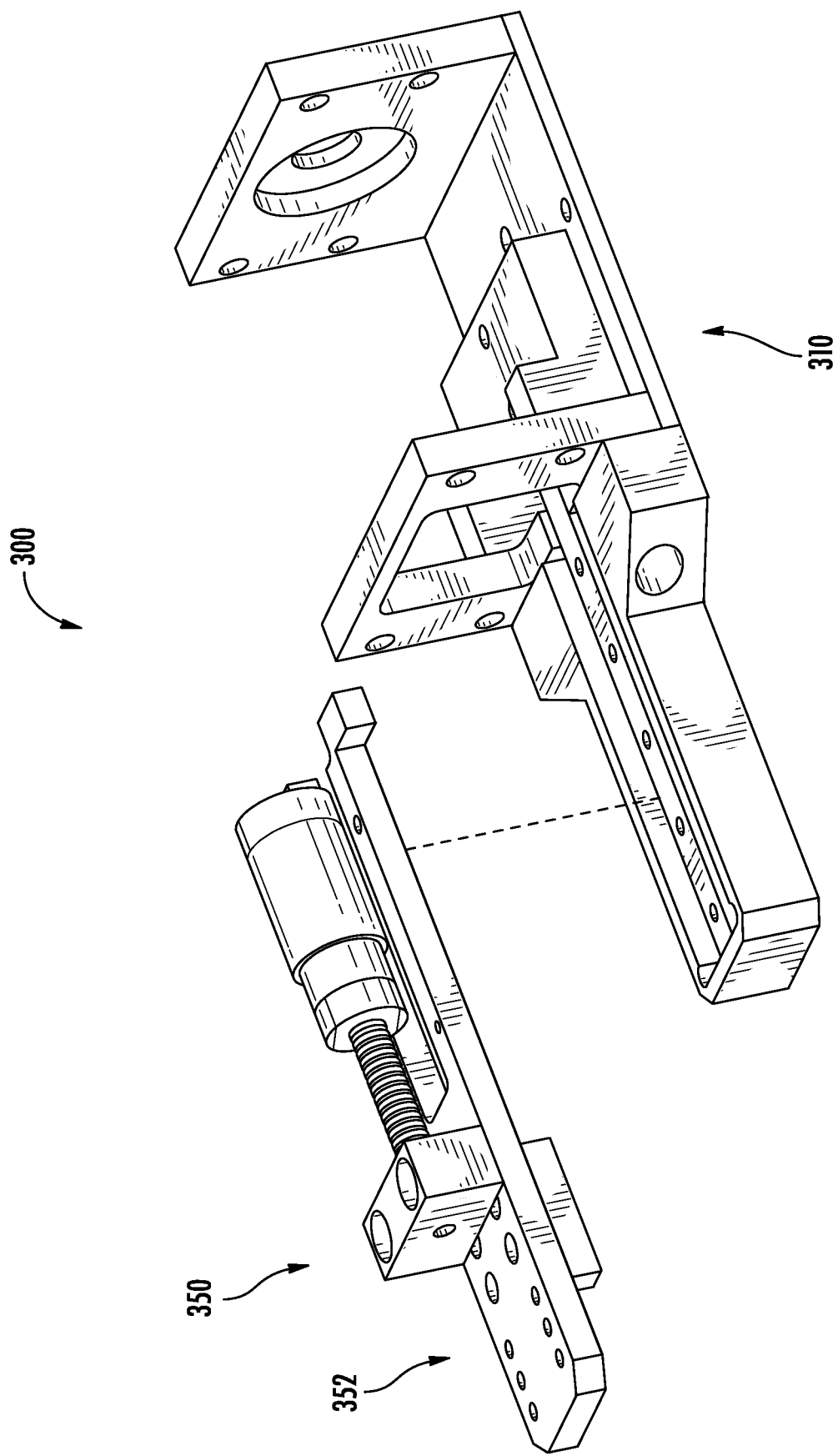
FIG. 4 is an exploded view of an indexing assembly, according to one embodiment.
Figure 8A:
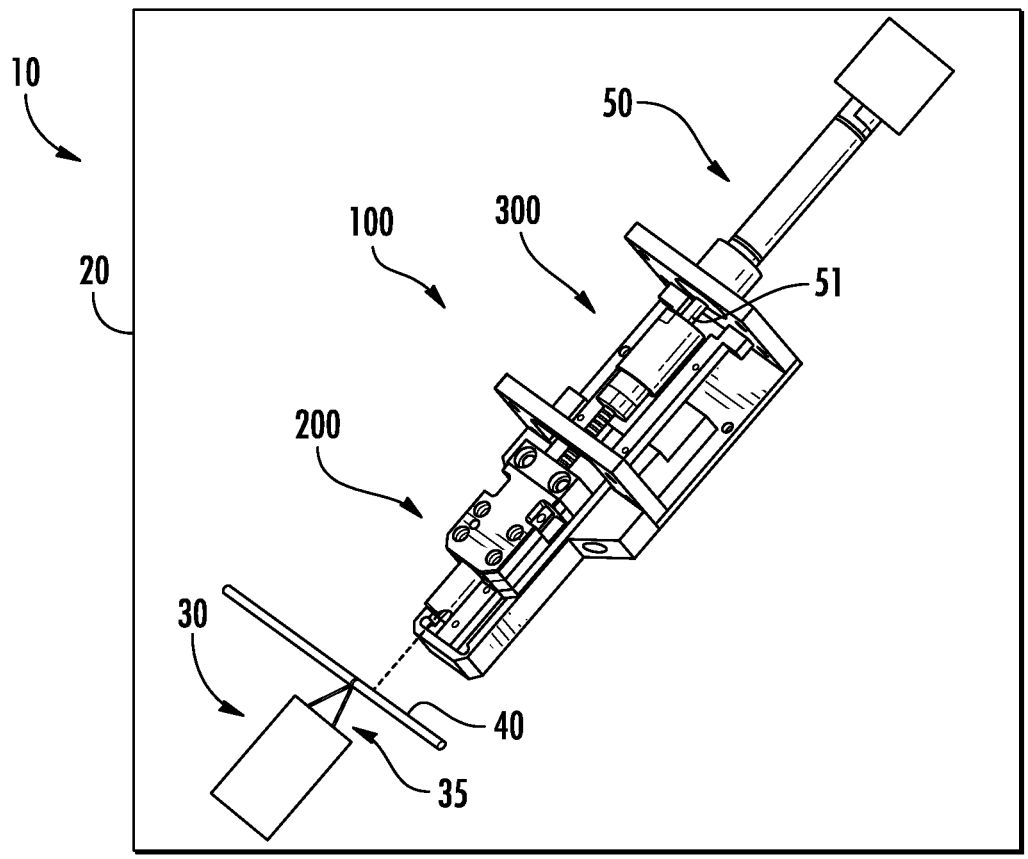
FIG. 8A illustrates a winding system during a winding phase of operation, according to one embodiment.
Figure 8B:
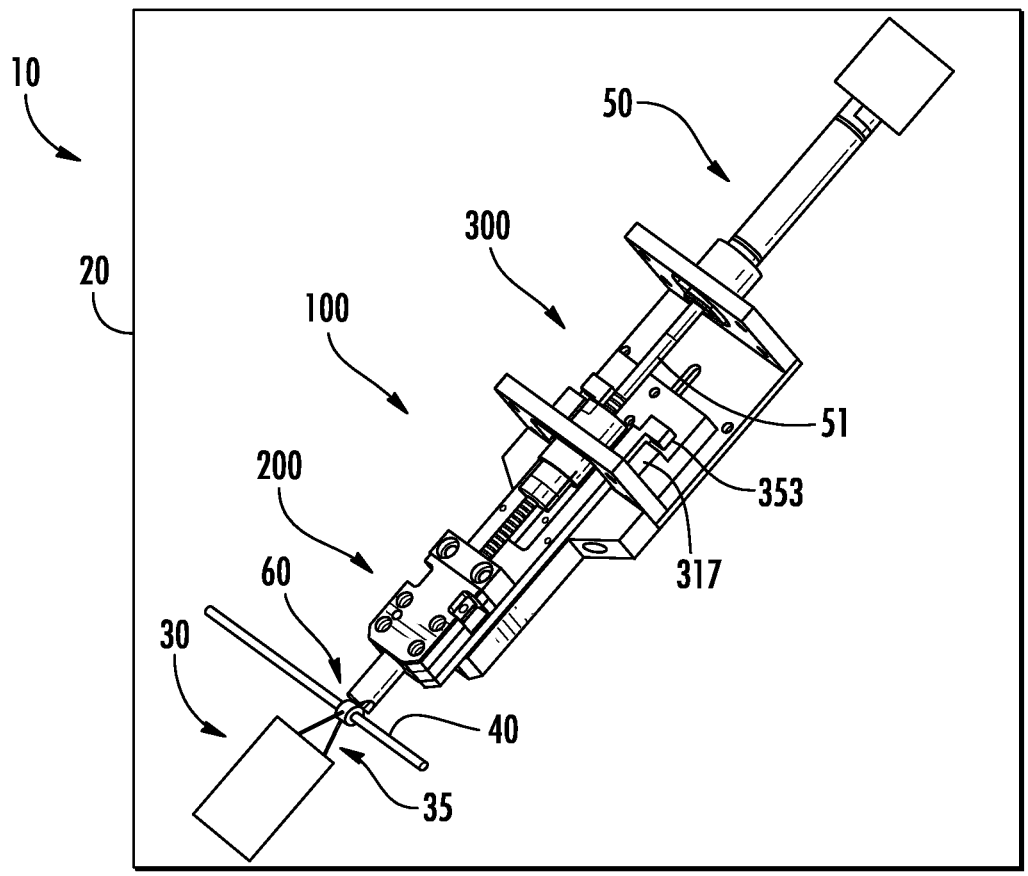
FIG. 8B illustrates the winding system of FIG. 8A during an initial phase in the operation of a bonding system of the winding system, according to one embodiment.
Figure 9:
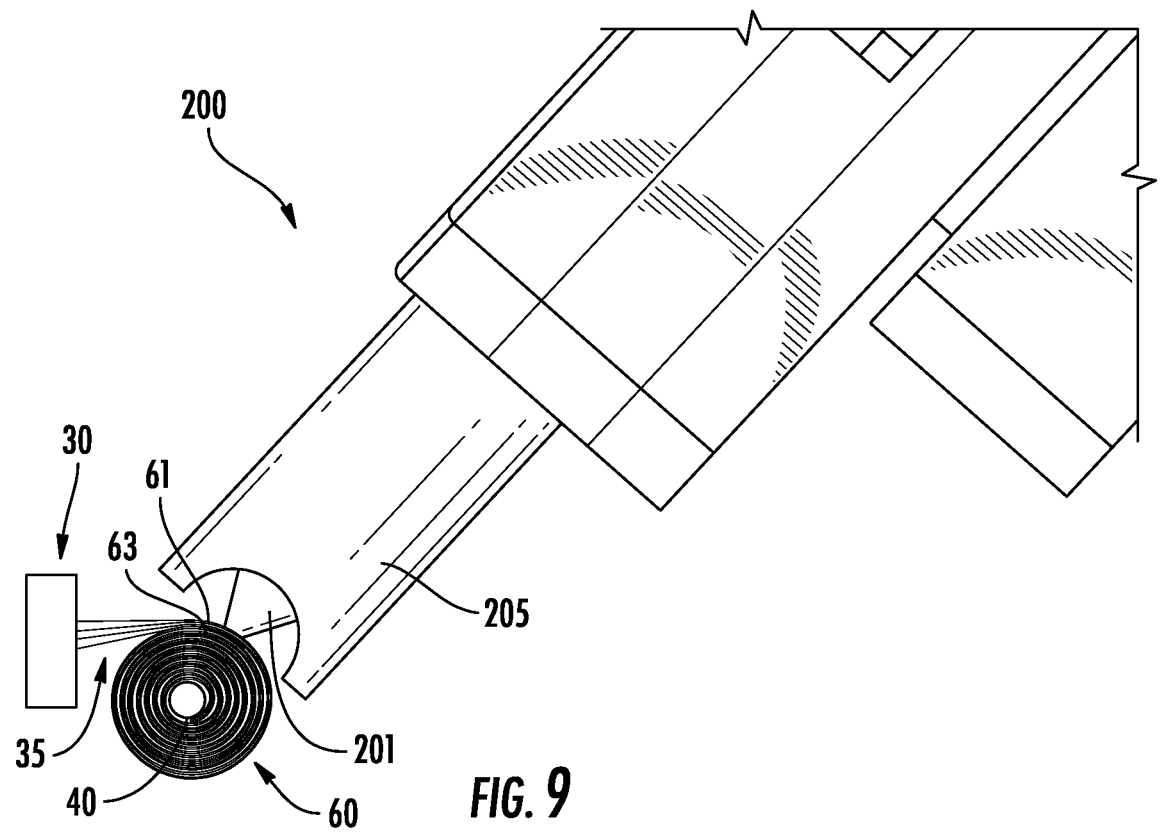
FIG. 9 illustrates the operation of a heating element of a bonding system to secure a wound electrode arrangement against loosening via heat-bonding, according to one embodiment.
Figure 10:
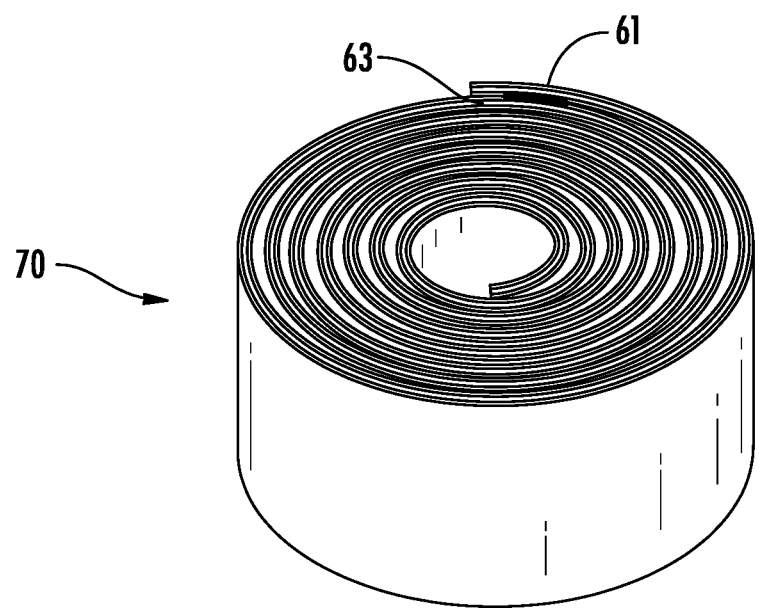
FIG. 10 is a representative finished jellyroll electrode that has been secured against loosening using a bonding system as described according to any embodiment herein.

Turning to FIG. 4, an indexing assembly 300 of the bonding system 100 is shown according to one example embodiment. The indexing assembly 300 operably connects the heating assembly 200 to an actuatable element 51 (see, e.g., FIGS. 8A and 8B) of an actuator 50. During operation of the actuator 50, the indexing assembly 300 utilizes energy from the actuatable element 51 to effectuate movement of the heating assembly 200 in a proximal direction (i.e., in a direction away from a wound electrode arrangement) or in a distal direction (i.e., in a direction towards a wound electrode arrangement). The actuatable element 51 may comprise any number of different components (e.g., a pneumatic cylinder) configured to move the heating assembly 200 in a linear direction between a retracted configuration (such as, e.g., shown in FIG. 8A) and an extended configuration (such as, e.g., shown in FIG. 8B) during operation of the actuator 50. As illustrated in FIGS. 8A and 8B, the actuatable element 51 is optionally provided as a component of a winding system 10 with which the bonding system 100 is used.

The indexing assembly 300 may be defined by a variety of structures and arrangements. For example, the indexing assembly 300 may be defined having a unitary, fixed structure, such that actuation of the actuatable element 51 results in a movement of the entirety of the bonding system 100. Alternatively, as representatively illustrated by the embodiment of FIG. 4, the indexing assembly 300 comprises a multi-piece structure including a transfer assembly 350 that undergoes movement responsive to actuation of the actuatable element 51, and a support assembly 310 that remains stationary and guides the movement of the transfer assembly 350 during operation of the actuator 50.

Figure 5A:
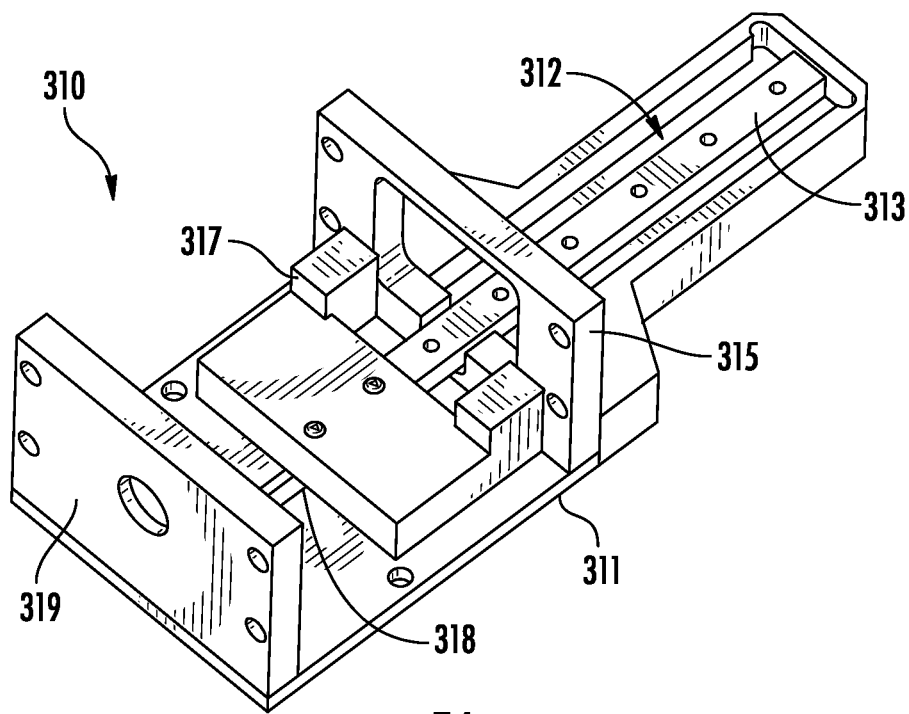
FIGS. 5A and 5B illustrate perspective views of a support assembly, according to one embodiment.
Figure 5B:
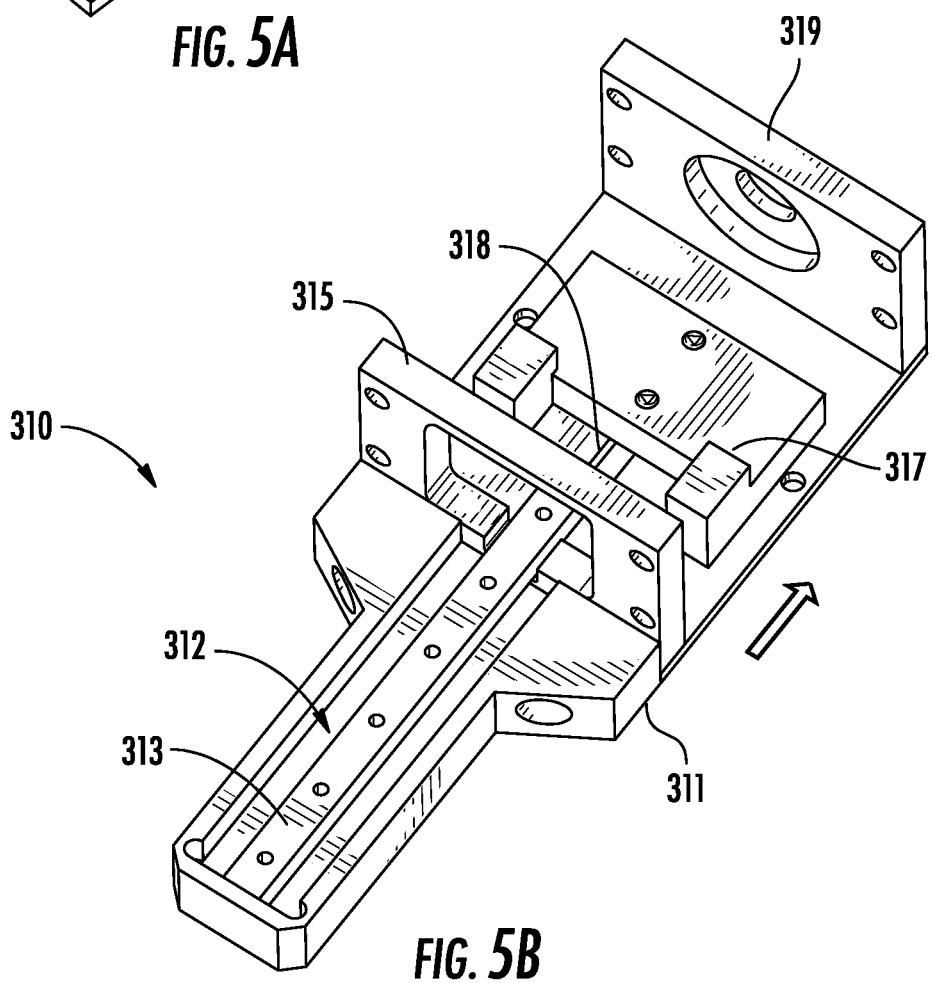

Turning to FIGS. 5A and 5B, a support assembly 310 is shown according to one example embodiment. The support assembly 310 generally includes a base plate 311, and a guide element 312 supported thereon. During actuation of the actuatable element 51, the guide element 312 (e.g., a guide rail 313) guides the movement of the transfer assembly 350 relative to the base plate 311.

Also optionally supported by the base plate 311 are a securement element 315 and a centering plate 319. The securement element 315 prevents inadvertent disengagement of the guide element 312 and a corresponding guide structure 355 of the transfer assembly 350. The centering plate 319 is supported relative to a proximal end of the base plate 311, and prevents misalignment of the actuatable element 51 during operation of the actuator 50.

A stop element 317 which limits travel of the transfer assembly 350 in the distal direction is also optionally supported relative to the base plate 311. As described below, a desired maximum distance by which the transfer assembly 350 (and heating assembly 200 attached thereto) is extendable may vary based on a variety of factors. Accordingly, the stop element 317 is optionally adjustably secured relative to the base plate 311, so as to allow a length of the transfer assembly 350 travel path to be varied as needed. For example, as representatively illustrated by the support assembly 310 embodiment of FIGS. 5A and 5B, the base plate 311 may be formed with an adjustment slot 318 that allows the stop element 317 to be selectively adjusted in a proximal direction (see, e.g., arrow in FIG. 5B) or distal direction relative to the base plate 311 to increase or decrease, respectively, a length of the travel path of the transfer assembly 350.

Figure 6:
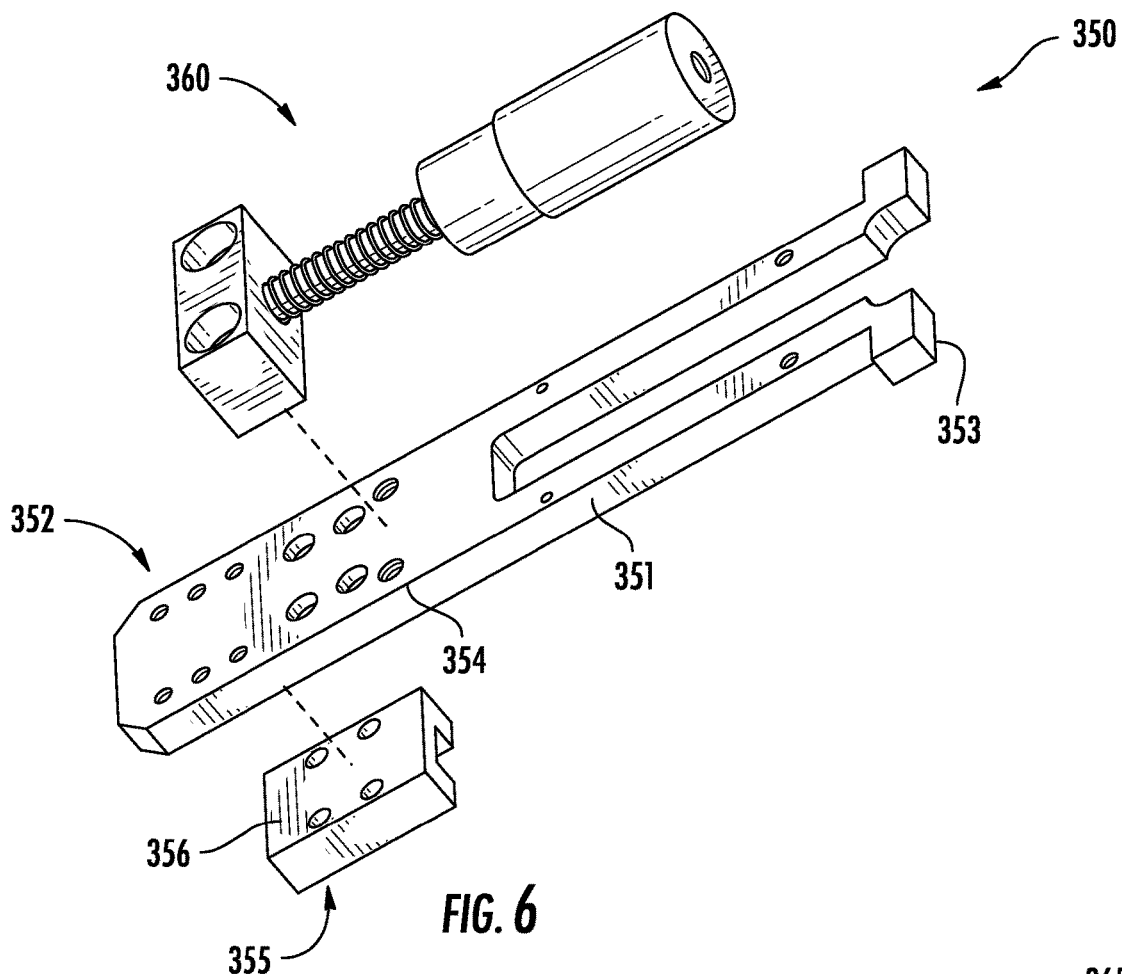
FIG. 6 is an exploded view of a transfer assembly, according to one embodiment.

Turning to FIG. 6, a transfer assembly 350 is shown according to one example embodiment. The transfer assembly 350 generally includes a guide structure 355 and connector component 360 that are each fixedly attached to a mounting plate 351. The connector component 360 allows the mounting plate 351 (and heating assembly 200 supported thereby) to be secured to the actuatable element 51, while the guide structure 355 moveably secures the mounting plate 351 relative to the support assembly 310.

The mounting plate 351 also includes (e.g., defines) a mounting surface 352 to which the housing 203 of the heating assembly 200 is fixedly secured (see, e.g., FIGS. 8A and 8B). Attachment structures (e.g. receiving apertures 354) are optionally provided along the upper surface and/or lower surface of the mounting plate 351, such that the location along the length of the mounting plate 351 at which the guide structure 355, connector component 360 and/or heating assembly 200 are affixed may be varied as needed.

The connector component 360 generally includes a proximal end that is fixedly securable to the actuatable element 51, and a distal end that is fixedly secured to the mounting plate 351. Thus, upon operation of the actuator 50, the connector component 360 transfer force from the actuatable element 51 to the mounting plate 351. This results in a movement of the mounting plate 351 (and heating assembly 200 attached thereto) relative to the support assembly 310. The movement of the mounting plate 351 relative to the support assembly 310 is guided via an engagement between the guide structure 355 (e.g., a carriage element 356) and the guide element 312 of the support assembly 310. As shown in FIG. 6, the engagement of an optional abutment flange 353 provided on (e.g., defined by) the mounting plate 351 with the optional stop element 317 of the support assembly 310 limits the degree of movement of the mounting plate 351 in a distal direction responsive to the actuation of the actuatable element 51.

The connector component 360 may be defined by a variety of structures and arrangements. In some embodiments, the connector component 360 transfers force directly from the actuatable element 51 to the mounting plate 351. However, during operation of the bonding system 100, the magnitude of the pressure that is to be applied to the wound electrode arrangement is often very low. Furthermore, because the electrode arrangements which the bonding system 100 is used to secure are typically very small, the application of pressure by the heating assembly 200 often requires a high degree of precision to avoid damage to the electrode arrangement.

Accordingly, the connector component 360 optionally includes an overload element 361 that provides a resistive force that opposes the force imparted onto the transfer assembly 350 by the actuator 50, such that the force imparted by the heating assembly 200 onto the electrode arrangement is less than the force provided by the actuator 50 to the connector component 360. The overload element 361 thus increases the granularity—and thereby precision—with which the heating assembly 200 is able to control the application of pressure onto the electrode arrangement during the bonding process.

Figure 7:
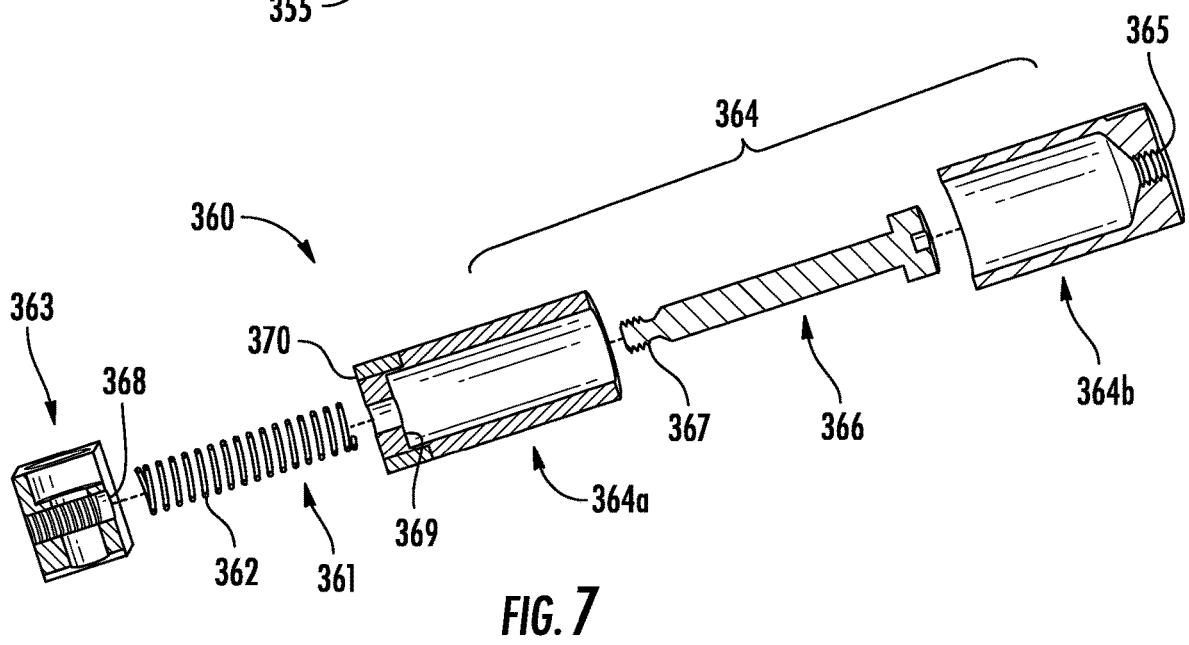
FIG. 7 is an exploded view of a connector component, according to one embodiment.

Referring to FIG. 7, a connector component 360 including an overload element 361 is shown according to an example embodiment. The overload element 361 (e.g., a spring 362) extends between a mounting block 363 fixedly secured relative to the mounting plate 351, and an adapter attachment 364 that is fixedly securable to the actuatable element 51 (e.g., via a threaded attachment 365). The overload element 361 is optionally supported about a bolt 366 that extends between the mounting block 363 and the adapter attachment 364. A distal end of the bolt 366 is fixedly secured to the mounting block 363 (e.g., via an engagement of threading 367 provided along the distal end of the bolt 366 and a thread attachment 368 of the mounting block 363).

A proximal end of the bolt 366 extends through an opening 369 formed through a lower portion of the adapter attachment 364.

During an initial phase in the operation of the bonding system 100, force from the actuator 50 is transferred to the mounting plate 351 to extend the heating assembly 200 into contact with the electrode arrangement. During this initial phase, the transfer assembly 350 encounters minimal resistance, and the engagement of the guide element 312 and guide structure 355 allows the transfer assembly 350 to travel freely (i.e. with minimal resistance) in the distal direction. Thus, a minimal amount of force is applied by the distally facing surface 370 of the lower portion of the adapter attachment 364 onto the proximal end of the overload element 361 during the travel of the transfer assembly 350 in the initial phase. Accordingly, the overload element 361 provides minimal opposing force to the distally directed force applied by the actuator 50.

Following the initial phase, the resistance to the distal movement of the transfer assembly 350 resulting from the contact between the transfer assembly 350 with the electrode arrangement causes the distally facing surface 370 of the adapter attachment 364 to increasingly compress the overload element 361 as the actuator 50 continues to be operated. This compression of the overload element 361 causes the overload element 361 to impart a proximally-directed resistive force that opposes the distally directed force applied by the actuatable element 51. As a result, the force transmitted by the heating assembly 200 to the electrode arrangement is less than the force provided the by actuator 50.

Because the bonding system 100 may be used to heat-bond electrode arrangements defined by various sizes, materials, etc., the desired degree of pressure to be applied by the heating assembly 200 may vary during different uses of the bonding system 100. Accordingly, the connector component 360 optionally allows the resistance of the optional overload element 361 to be varied during different operations of the bonding system 100. For example, the overload element 361 may be releasably attached to the connector component 360, so as to allow overload elements 361 offering varying degrees of resistance to be substituted during different operations of the bonding system 100.

Alternatively, or additionally, the connector component 360 optionally allows a length of the overload element 361 to be adjusted, so as to modify the effective resistance provided by the overload element 361. For example, as representatively illustrated by the connector component 360 embodiment of FIG. 7, the adapter attachment 364 optionally includes a pair of concentrically arranged cylinders 364a, 364b having engagement structures (not shown) that allow the lower cylinder 364a to be selectively moved relative to the upper cylinder 364b to vary a distance between the distally facing surface 370 of the lower portion of the lower cylinder 364a and the mounting block 363. Because the overload element 361 extends between the distally facing surface 370 of the lower cylinder 364a and the mounting block 363, the adjustment of the lower cylinder 364a relative to the upper cylinder 364b results in a corresponding change in a length- and thereby degree of compression—of the overload element 361. This modification of the compression of the overload element 361 varies the resistance provided by the overload element 361 to a predetermined degree of force, and thus further increases the precision with which pressure may be applied during operation of the bonding system 100.

Turning to FIGS. 8A-10, a system for, and a method of, securing a wound electrode arrangement 60 against unwinding is described according to an example embodiment. As shown in FIGS. 8A and 8B, the bonding system 100 is optionally provided as a component of a winding system 10. For example, the bonding system 100 is optionally moveably mounted relative to the housing 20 of the winding system 10 (e.g., via a mounting element 450 such as representatively illustrated in FIG. 2). In addition to supporting the bonding system 100, the housing 20 also supports a winding assembly 30 and an actuator 50 that is used during operation of the bonding system 100, and optionally also during the operation of the winding assembly 30.

During a winding phase of the operation of the winding system 10, the winding assembly 30 is operated to wind electrode components 35 about a mandrel 40 supported by the housing 20 to form a wound electrode arrangement 60. As shown in FIG. 8A, during the winding phase, the transfer assembly 350 of the bonding system 100 is optionally held in a retracted configuration, which provides clearance between the bonding system 100 and the mandrel 40.

In addition to preventing inadvertent interference of the bonding system 100 with the operation of the winding assembly 30, the clearance between the heating assembly 200 and the mandrel 40 provided upon optionally actuating the bonding system 100 to a retracted configuration as shown in FIG. 8A also increases the accessibility of the mandrel 40, and thus facilitates the capture of electrode components 35 about the mandrel 40 during an initial set-up phase during operation of the winding assembly 30.

Following the completion of the winding phase, and prior to the removal of the wound electrode arrangement 60 from the mandrel 40, the bonding system 100 is operated to secure the components 35 of the electrode arrangement 60 against unwinding. At the start of this bonding phase in the operation of the winding system 10, the actuatable element 51 is actuated to transition the transfer assembly 350 between an initial retracted configuration (such as, e.g., shown in FIG. 8A) and an initial extended configuration (such as, e.g., shown in FIG. 8B) in which the contact surface 202 of the distal tip of the heating assembly 200 is positioned in pressured or non-pressured contact with an outer surface of the electrode arrangement 60.

The distance by which the transfer assembly 350 is extended at the initiation of the bonding phase is dependent based on the desired degree of pressure (or lack thereof) with which the heating element 201 of the heating assembly 200 is to initially contact the electrode arrangement 60. In some embodiments, the heating assembly 200 is operated to apply a constant or varied amount of pressure to the electrode arrangement 60 that is sustained throughout the entirety of the bonding process. The transfer assembly 350 may accordingly initially be extended by a distance required for the heating assembly 200 to exert the desired amount of pressure onto the electrode arrangement 60.

According to other embodiments, the heating assembly 200 is operated to only apply and sustain pressure to the electrode arrangement 60 intermittently throughout the duration of the bonding process. The distance by which the transfer assembly 350 is initially extended thus optionally corresponds to a minimum distance required to bring the contact surface 202 of the heating element 201 into engagement with (but without applying any pressure to) the exterior of the electrode arrangement 60. Following the positioning of the heating element 201 in such a no-pressure initial contact configuration, subsequent extension of the transfer assembly 350 effectuated by the operation of the actuator 50 allows desired amounts of pressure to be applied by the heating assembly 200 To the electrode arrangement 60.

The movement of the heating assembly 200 to the initial extended configuration may be effectuated according to a variety of methods. For example, in embodiments in which the heating assembly 200 is operated to impart a sustained pressure onto the electrode arrangement 60 upon initiation of the bonding process, a distance by which the transfer assembly 350 needs to be actuated initially may be calculated using known operating parameters of the bonding system 100 and electrode arrangement 60. Variables that may be used to determine the required length of the transfer assembly 350 travel path include, e.g., a diameter of the wound electrode arrangement 60, a distance between the mandrel 40 and the contact surface 202 of the heating element 201, resistance provided by the optional overload element 361, a distance between the heating element 201 and the actuator 50, the operating force of the actuator 50, etc. In some embodiments, this calculated distance is used to adjust the position of the stop element 317 relative to the base plate 311, thus allowing the desired amount of pressure to be applied to the electrode arrangement 60 simply by operating the actuator 50 to extend the transfer assembly 350 in the distal direction until the abutment flange 353 is brought into engagement with the stop element 317.

According to other embodiments, the operation of the actuator 50 to extend the transfer assembly 350 to the initial contact configuration is additionally, or alternatively, based on real-time measurements obtained by a pressure sensor (not shown) as the heating element 201 is brought into contact with the electrode arrangement 60. A proportional integral derivative ("PID") controller, or other type of controller, utilizes the measured pressure readings to control operation of the actuator 50 to effectuate a distal movement of the transfer assembly 350 until the desired amount of pressure has been applied to the electrode arrangement 60.

In embodiments utilizing such real-time pressure monitoring, the engagement between the stop element 317 and abutment flange 353 is optionally used as a failsafe to prevent extension of the transfer assembly 350 in excess of a predetermined maximum length. For example, the stop element 317 is optionally positioned relative to a length of the base plate 311 so as to prevent the heating element 201 from inadvertently being extended into contract with the mandrel 40. As another example, the stop element 317 is optionally positioned relative to the base plate 311 such that length of the travel path of the transfer assembly 350 is greater by a predetermined amount than an expected travel path length calculated prior to operation of the bonding system 100 in the bonding phase.

Prior to (or alternatively, following) the extension of the transfer assembly 350 into the initial contact configuration, the heating element 201 is heated to a target temperature. The target temperature corresponds to a temperature that allows the outermost wind layer 61 of the electrode arrangement 60 to melt and bond to an underlying wind layer 63, without resulting in any damage to the remaining portions of the electrode arrangement 60. The target temperature may vary based on factors such as, e.g., ambient temperature, the size of the electrode arrangement 60, the composition of the electrode components 35, etc.

The operation of the heating element 201 to attain the target temperature is effectuated via the precise, controlled supply of current to the heating element 201. As the temperature of the heating element 201 may vary based on factors besides the amount of current supplied to the heating element 201 (e.g., ambient temperature, etc.), an optional PID, or other, controller may use readings of the temperature of the heating element 201 obtained by a temperature sensor (not shown) to adjust the amount of current supplied by the electrical connector 207 to the heating element 201.

During the bonding phase in the operation of the bonding system 100, the heating assembly 200 is operated to apply heat and pressure to the exterior of the electrode until a heat-bonded securement of the electrode arrangement 60 (such as, e.g., representatively illustrated in FIG. 9) has been achieved. The duration of the heating assembly 200 may vary based of a variety of factors. For example, in some embodiments, the duration of the bonding phase is controlled by a timing circuit that terminates the operation of bonding system 100 following the expiration of a predetermined time following initiation of the bonding phase. At the end of the timer interval set by the timing circuit, operation of the actuator 50 to supply a sustained pressure to the electrode arrangement 60 is ceased (i.e., e.g., by effectuate a transition of the transfer assembly 350 to a fully or partially retracted configuration) and/or the supply of current to the heating element 201 is stopped. In embodiments in which the degree of heat and/or pressure applied to the electrode arrangement 60 is varied during the bonding phase, the timing circuit may optionally also (or alternatively) be used to vary the pressure imparted by and/or current supplied to the heating element 201 at one or more intervals during the bonding phase.

According to other embodiments, the duration of the bonding phase may be controlled based on one or more measured or detected parameters. For example, the outermost wind layer 61 of the electrode arrangement 60 may undergo a change in color and/or transparency as it is melted by the heating element 201. In such embodiments, an optional optical sensor (not shown) monitors this visual change of the electrode arrangement 60 and controls the operation of the heating assembly 200 accordingly.

Following the completion of the bonding phase, the electrode components 35 are separated (e.g., cut) from their respective sources (e.g., spools), and the finished, secured electrode arrangement 60 is removed from the mandrel 40. A finished jellyroll electrode 70 that has been secured against loosening using the bonding system 100 is representatively shown in FIG. 10.

Although in FIGS. 8A-10 the outermost wind layer 61 is shown as comprising each of the components 35 forming the electrode arrangement 60 (e.g., a first separator layer, an anode layer, a second separator layer, and a cathode layer), in other embodiments (not shown), the outermost wind layer 61 optionally comprises less than all of the components 35 of the electrode arrangement 60.

For example, upon completion of the winding process, the first separator layer, anode layer and cathode layer may be separated (e.g., cut) from their respective sources (e.g., spools). Once these layers have been separated, an additional layer(s) of the second separator is wound about the exterior of the electrode arrangement 60, such that an outermost wind layer 61 of the second separator layer directly overlays, and is in direct contact with, an underlying wind layer 63 of the second separator layer. Accordingly, in such embodiments, only the second separator layer will be melted during the operation of the heating assembly 200.

As used herein, the terms "about" and "approximately" will be understood by persons of ordinary skill in the art and will vary to some extent depending upon the context in which they is used. If there are uses of these terms which are not clear to persons of ordinary skill in the art, given the context in which it is used, "about" and "approximately" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

While certain embodiments have been illustrated and described, it should be understood that changes and modifications may be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

Other embodiments are set forth in the following claims.

What is claimed is:

1. A method of securing an electrode arrangement against loosening, the method including:
   operating an actuatable element to apply a force to extend a heating element of a bonding system into contact with an exterior of an electrode arrangement formed from a wound arrangement of electrode components, each of the electrode components having a first end and a second end, wherein a first end of each electrode component defines a portion of the wound electrode arrangement, and a second end of each electrode component is held in tension, and does not define a portion of the wound electrode;
   varying a length of an overload element to change a resistive force provided by the overload element and applied to the actuatable element, wherein the resistive force controls a movement of the actuatable element such that the heating element is limited to application of a predetermined amount of force;
   applying the predetermined amount of force to the exterior of the electrode arrangement via the heating element, wherein the predetermined amount of force is less than the force applied by the actuatable element;
   while the predetermined amount of force is being applied to the electrode arrangement by the heating element, operating the heating element to heat the electrode arrangement;
   terminating the application of force and heat to the electrode arrangement; and
   cutting the electrode components;
   wherein at least one of the electrode components is cut following the termination of the application of heat and force to the electrode arrangement.

2. The method of claim 1, wherein the second end of each electrode is held in tension until the electrode component is cut.

3. The method of claim 1, wherein an outermost wind layer of the electrode arrangement is heat-bonded to an underlying wind layer upon termination of the application of heat and force to the electrode arrangement.

4. The method of claim 1, wherein the application of force and heat to the electrode arrangement is terminated following a melting of an outermost wind layer of the electrode arrangement.

5. The method of claim 1, wherein a force imparted by the heating element onto the electrode arrangement is less than a force provided by an actuator to the bonding system.

6. The method of claim 1, wherein at least one of the electrode components is cut and at least one electrode component remains uncut prior to the application of heating and force to the electrode arrangement.

7. The method of claim 6, wherein the uncut electrode component is wound about the outermost wind layer of the electrode arrangement prior to the application of heat and force to the electrode arrangement.

8. The method of claim 7, wherein an outermost wind layer of the uncut electrode component is heat-bonded directly to an underlying wind layer of the uncut electrode component upon termination of the application of heat and force to the electrode arrangement.

9. The method of claim 8, wherein the application of heat and force to the electrode arrangement is terminated responsive to an observed change in at least one of a color and degree of transparency of an outermost layer of the electrode arrangement.

10. The method of claim 1, further comprising varying at least one of the force or the heat applied to the exterior of the electrode arrangement.

* * * * *